United States Patent
Wang et al.

(10) Patent No.: US 8,546,046 B2
(45) Date of Patent: Oct. 1, 2013

(54) METHOD FOR FABRICATING BI-POLAR PLATE OF FUEL CELL AND BI-POLAR PLATE OF FUEL CELL

(75) Inventors: Wen-Lin Wang, Kaohsiung County (TW); Chun-Hsing Wu, Taipei (TW); Kan-Lin Hsueh, Hsinchu County (TW); Huan-Ruei Shiu, Penghu County (TW); Wen-Chen Chang, Hsinchu County (TW); Fang-Hei Tsau, Kaohsiung (TW); Lung-Yu Sung, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 388 days.

(21) Appl. No.: 12/708,192

(22) Filed: Feb. 18, 2010

(65) Prior Publication Data

US 2011/0123906 A1    May 26, 2011

(30) Foreign Application Priority Data

Nov. 20, 2009   (TW) .............................. 98139650 A (51) Int. Cl.
*H01M 4/64*   (2006.01)
(52) U.S. Cl.
USPC ............................. 429/518; 429/520; 429/521
(58) Field of Classification Search
USPC ................................................ 429/517–522
See application file for complete search history.

(56) References Cited

U.S. PATENT DOCUMENTS

| 6,828,040 B2 | 12/2004 | Cunningham et al. | |
|---|---|---|---|
| 2001/0028974 A1* | 10/2001 | Nakata et al. | 429/34 |
| 2002/0192523 A1 | 12/2002 | Cisar et al. | |
| 2002/0195335 A1 | 12/2002 | Cisar et al. | |
| 2003/0036001 A1 | 2/2003 | James et al. | |
| 2005/0158607 A1* | 7/2005 | Vyas et al. | 429/34 |

FOREIGN PATENT DOCUMENTS

| TW | I221039 B | 9/2004 |
|---|---|---|
| TW | I222765 B | 10/2004 |
| TW | M264664 U | 5/2005 |
| TW | I246792 B | 1/2006 |
| TW | I311830 B | 7/2009 |
| TW | 200945650 A | 11/2009 |
| WO | 9936594 A1 | 7/1999 |

OTHER PUBLICATIONS

Jinfeng Wu, Xiao Zi Yuan, Jonathan J. Martin, Haijiang Wang, Jiujun Zhang, Jun Shen, Shaohong Wu, Walter Merida, A review of PEM fuel cell durability: Degradation mechanisms and mitigation strategies, Journal of Power Sources, vol. 184, Issue 1, Sep. 15, 2008, pp. 104-119, ISSN 0378-7753, 10.1016/j.jpowsour.2008.06.006.*

(Continued)

*Primary Examiner* — Patrick Ryan
*Assistant Examiner* — Jose Colucci Rios
(74) *Attorney, Agent, or Firm* — Morris Manning & Martin LLP; Tim Tingkang Xia, Esq.

(57) ABSTRACT

A method for fabricating a bi-polar plate of a fuel cell and the bi-polar plate thereof are presented. A graphite film is formed first. Next, a polymeric material added with electrically conductive powder is coated on a surface of a metal substrate. The graphite film is disposed on the polymeric material and the polymeric material is hardened to form an adhesive layer, such that the graphite film is attached on the surface of the metal substrate.

12 Claims, 14 Drawing Sheets

(56) References Cited

OTHER PUBLICATIONS

Hay et al., New Materials and Procedures to Protect Metallic PEM Fuel Cell Bipolar Plates, Journal of the Electrochemical Society, 149 (7) A905-A911 (2002).*

Intellectual Property Office, Ministry of Economic Affairs, R.O.C., "Office Action", Jun. 14, 2012, Taiwan.

N. Cunningham et al., New Materials and Procedures to Protect Metallic PEM Fuel Cell Bipolar Plates, Journal of the Electrochemical Society, 2002, P.A905-A911, vol. 149, No. 7.

* cited by examiner

METHOD FOR FABRICATING BI-POLAR PLATE OF FUEL CELL AND BI-POLAR PLATE OF FUEL CELL

CROSS-REFERENCE TO RELATED APPLICATIONS

This non-provisional application claims priority under 35 U.S.C. §119(a) on Patent Application No(s). 098139650 filed in Taiwan, R.O.C. on Nov. 20, 2009, the entire contents of which are hereby incorporated by reference.

BACKGROUND OF THE INVENTION

1. Field of Invention

The present invention relates to a fuel cell, and more particularly to a method for fabricating a bi-polar plate of a fuel cell and the bi-polar plate thereof.

2. Related Art

The fuel cell, characterized in having high efficiency, quick reaction, silent operation, and low pollution, is widely applied in fields such as electricity, industry, transportation, space, and military. The fuel cell is a power generation device capable of continuously converting chemical energy into electric energy directly. When the fuel cell is working, a fuel gas (for example, $H_2$) and a combustion supporting agent (for example, $O_2$) are transferred to an anode and a cathode of the fuel cell respectively, and the chemical energy is converted into electric energy through oxidation and reduction reactions.

The structure of a conventional fuel cell is generally formed of an anode plate, a cathode plate, and a solid electrolyte membrane sandwiched therebetween, which is also called a single cell. However, in practice, a plurality of single cells is connected in series to obtain a large output voltage. The adjacent fuel cells share one electrode plate, so that the electrode plate serves as both an anode and a cathode of the two adjacent fuel cells, and is thus referred to as a bi-polar plate.

The bi-polar plate is mainly made of a material having high electrical conductivity such as graphite, composite carbon, and metal. In order to satisfy the demand for high power density, light weight, and flexibility of the fuel cell in the market, the bi-polar plate needs to be designed lighter and thinner. However, if the graphite plate or composite carbon plate is made very thin, problems including undesirable air-tightness and insufficient structural strength of the bi-polar plate may occur, or fractures during processing or use may be easily caused due to material characteristics of the graphite such as low hardness and poor ductility.

The metallic material is easily processed and suitable for mass production, and also has excellent electrical conductivity and thermal conductivity, so that a thin and light bi-polar plate can be obtained with such the material. However, in the working process of the fuel cell, due to the reaction of the fuel or oxidant, the surface of the metal bi-polar plate may be easily oxidized and corroded to cause deterioration of the performance of the fuel cell and shortening of its service life. If corrosion-resistant noble metal, such as Au or Pt, is used to fabricate the bi-polar plate, or a protection layer made of noble metal is plated on the surface of the metal bi-polar plate, the manufacturing cost becomes rather high.

Taking a bi-polar plate made of a corrosion-resistant metallic material such as stainless steel, Al, or Ti for example, a dense oxidation layer formed of oxides can be provided on a surface of the bi-polar plate to avoid corrosion on the surface of the bi-polar plate caused by the electrolyte. However, the oxidation layer may also raise the contact resistance of the surface, so that the capability of the bi-polar plate for conducting electrons is deteriorated, and a total output voltage of the fuel cell is reduced.

A bi-polar plate structure of a fuel cell is presented in U.S. Pat. No. 6,828,040 (referred to as U.S. Pat. No. 040 for short hereinafter). In this structure, a polymeric material is spray-coated on a stainless steel substrate and bonded to the substrate through pyrolysis. Electrically conductive graphite is added in the polymeric material to reach a content of at least 90% in total, thereby isolating the stainless steel substrate from the corrosion and oxidation effects of the ambient environment and acquiring electrically conductive characteristics at the same time.

However, in U.S. Pat. No. 040, as an electrically conductive protection film is formed by spray-coating and the solvent in the polymeric material is volatilized in the pyrolysis process, plenty of small holes are generated in the eventually formed electrically conductive protection film, resulting in an undesirable density of the protection film, such that the acid solution of the fuel cell may penetrate into the bi-polar plate through these small holes. Thereby, in U.S. Pat. No. 040, multiple layers of the polymeric material need to be coated on the surface of the stainless steel substrate, and several pyrolysis processes are required to avoid the above problem. However, in this case, the fabrication process of the bi-polar plate becomes too complicated and the manufacturing cost is largely increased.

SUMMARY OF THE INVENTION

Accordingly, the present invention is a method for fabricating a bi-polar plate of a fuel cell and the bi-polar plate of the fuel cell thereof, so as to solve the problems in the prior art that the conventional bi-polar plate of a fuel cell is much limited in use and has undesirable use efficiency due to characteristics of the graphite, or has a complicated fabrication process and high manufacturing cost due to several subsequent surface treatment procedures when made of a metallic material.

The method for fabricating the bi-polar plate of the fuel cell provided by the present invention comprises the following steps. First, a metal substrate is provided and a graphite film is formed. A polymeric material added with electrically conductive powder is provided on a surface of the metal substrate. Then, the graphite film is disposed on the polymeric material, the polymeric material is hardened to form an adhesive layer, and the graphite film is bonded on the metal substrate.

The bi-polar plate of the fuel cell provided by the present invention comprises a metal substrate, an adhesive layer, and a graphite film. The adhesive layer is disposed on a surface of the metal substrate and contains electrically conductive powder. The graphite film is disposed on the adhesive layer.

In the present invention, the graphite film is formed first, and then the graphite film is bonded to the metal substrate via the adhesive layer, instead of premixing the graphite with polymer resin to form a mixed material on the metal substrate. The method for fabricating the bi-polar plate of the present invention is different from that of the conventional bi-polar plate.

Therefore, the fabrication method of the present invention can avoid a large number of internal defects generated when the graphite film (that is, the electrically conductive protection layer) is formed, thereby improving the use efficiency and prolonging the service life of the bi-polar plate, so as to achieve the effects of being light and thin, enabling mass production, acquiring good corrosion-resistant performance, and lowering the manufacturing cost.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

FIG. 1 and FIGS. 2 to 6 are respectively a flow chart of a process and schematic views of detailed steps in the process according to an embodiment of the present invention.

Figure 1:
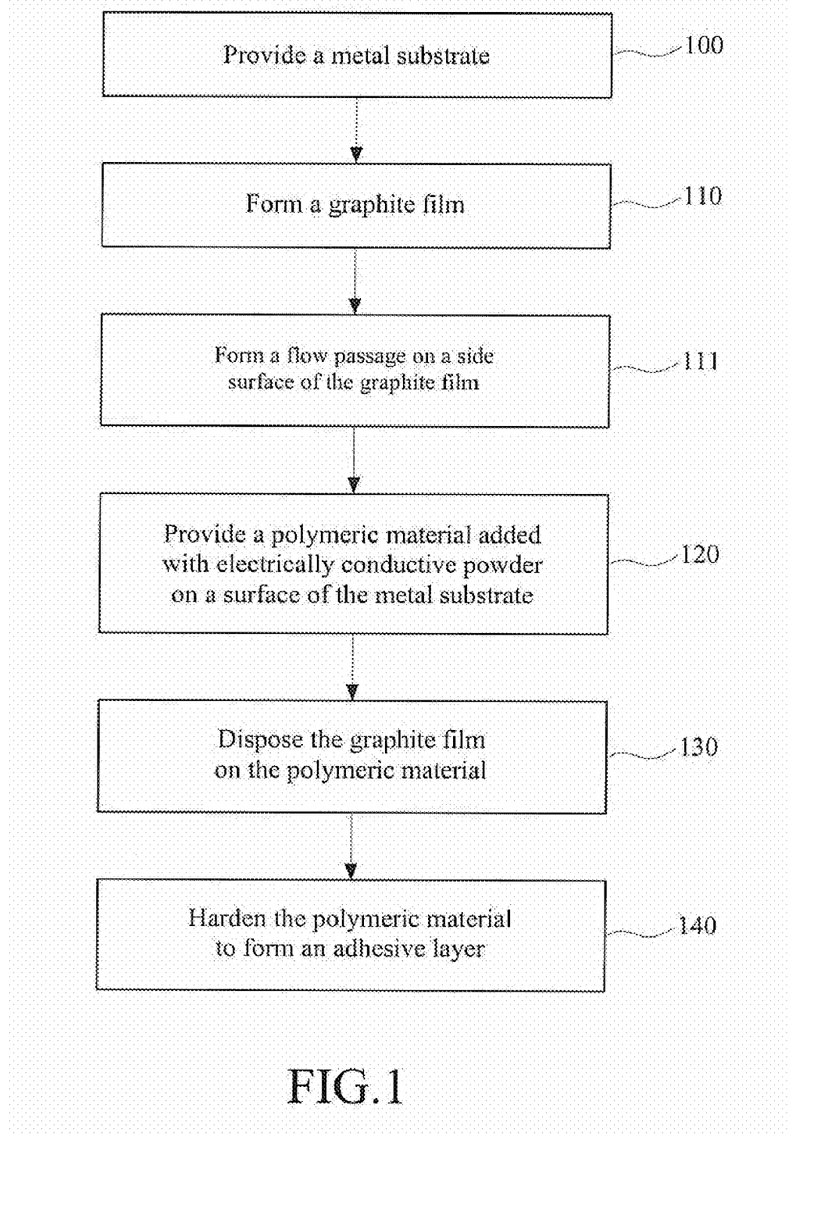
FIG. 1 is a flow chart of a process according to the present invention.
Figure 2:
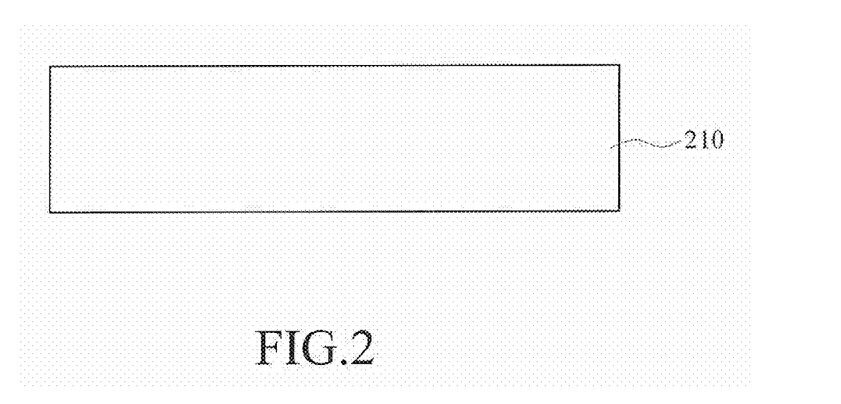
FIGS. 2 to 6 are schematic views of detailed steps in the process according to the present invention.
Figure 3A:
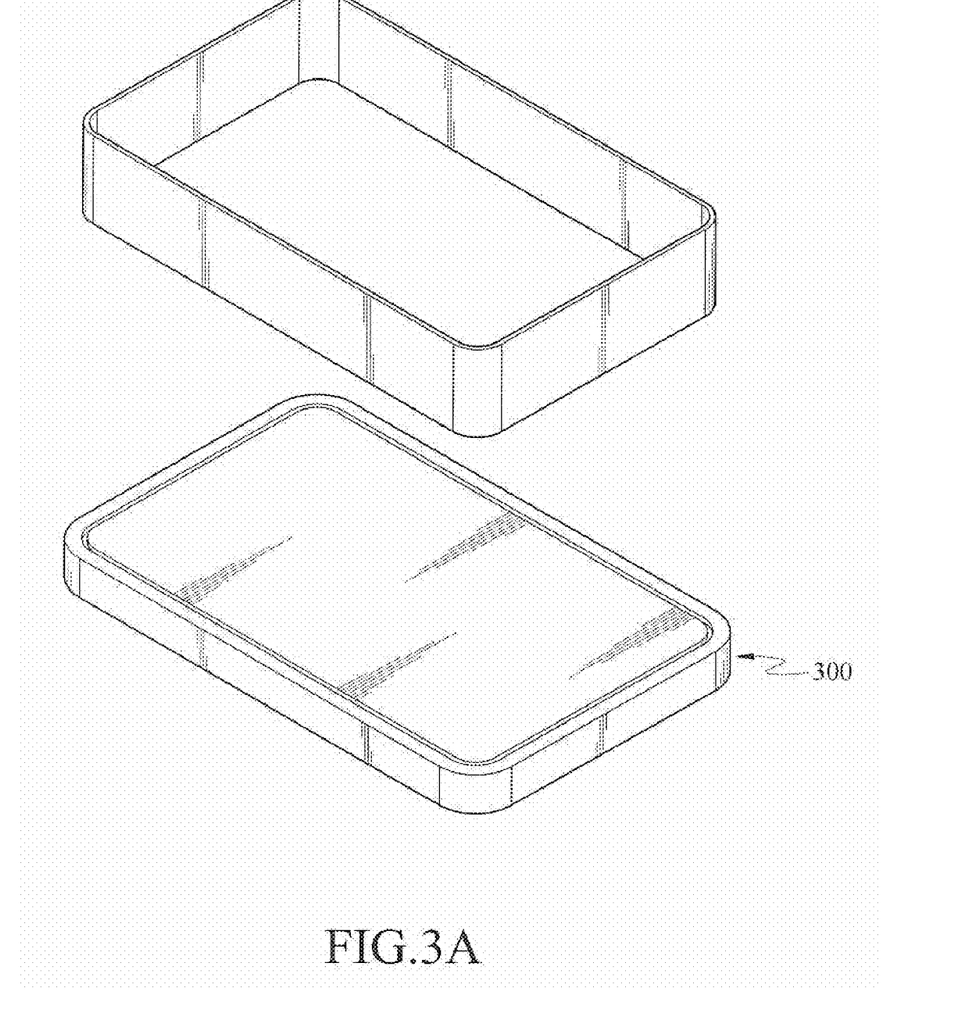
Figure 3B:
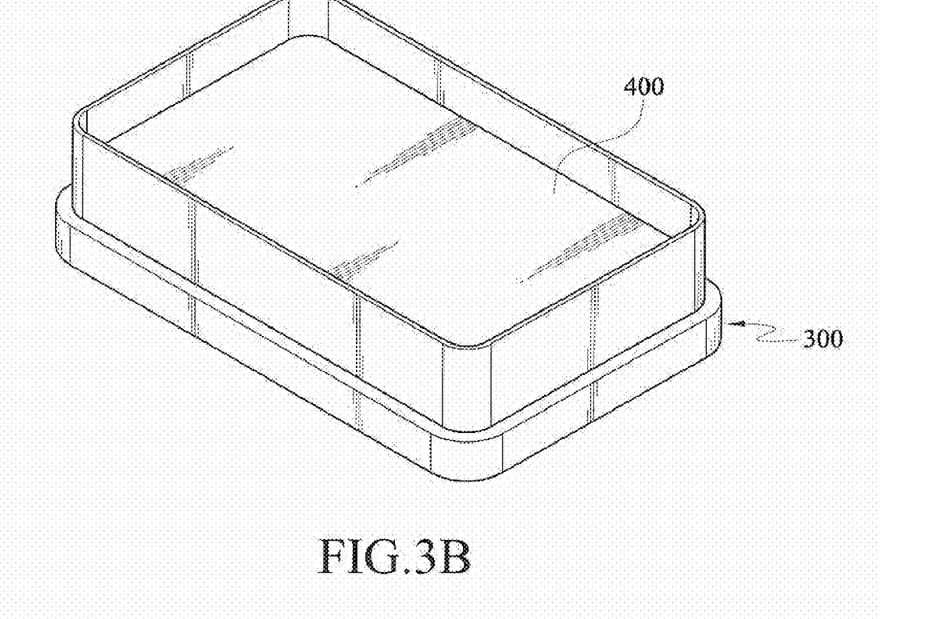
Figure 3C:
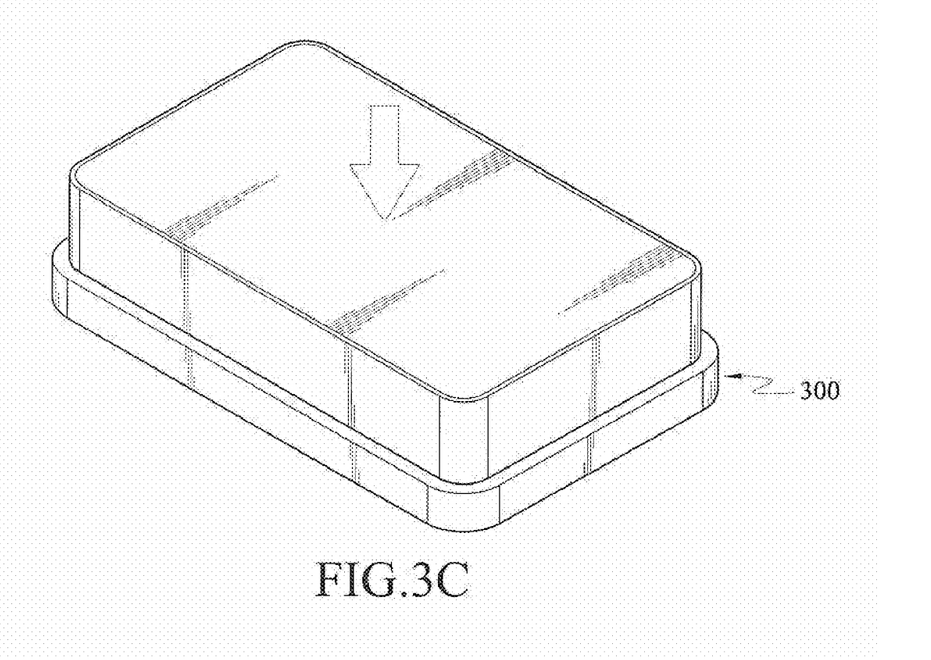
Figure 3D:
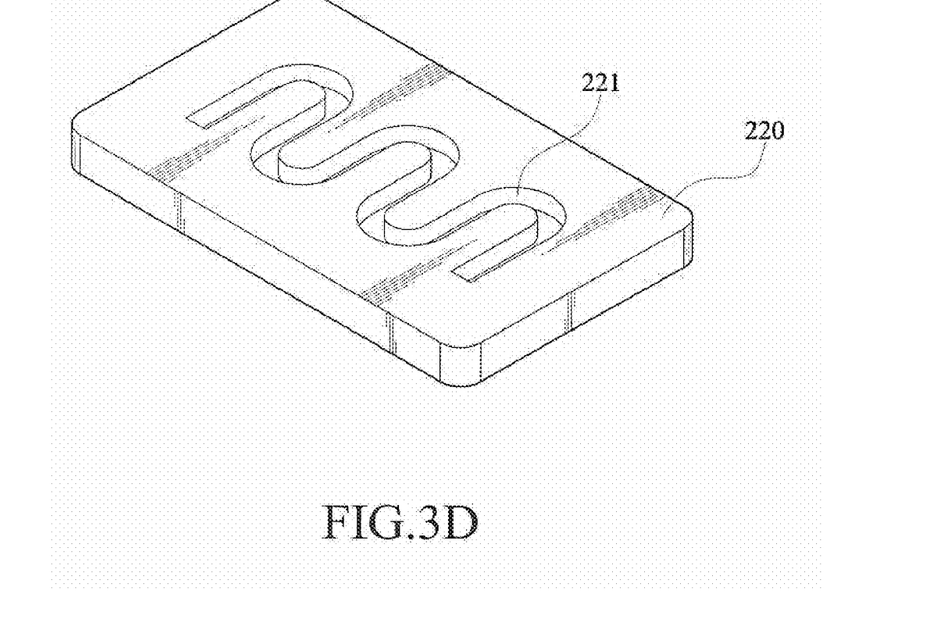

Referring to FIGS. 2 to 3D together with the process in FIG. 1, a method for fabricating a bi-polar plate of a fuel cell provided by the present invention comprises the following steps. First, a metal substrate 210 is provided (Step 100). The metal substrate 210 is made of Al, Ti, Ni, Cu, Cr, Sn, or any alloy thereof, or stainless steel. In this embodiment, the metal substrate 210 is made of 316L stainless steel and has a thickness between 0.1 mm and 0.2 mm, but the present invention is not limited thereto. In addition, the fuel cell mentioned in the present invention is, but not limited to, a proton exchange membrane fuel cell (PEMFC).

Figure 7:
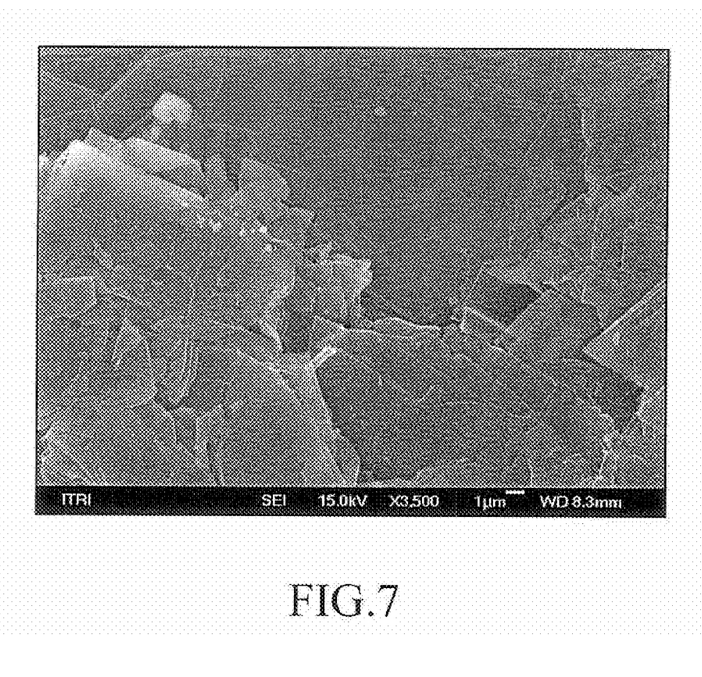
FIG. 7 is an electron microscopy view of a graphite film according to the present invention.

Next, a graphite film 220 is formed (Step 110). The graphite film 220 is formed with a jig 300 by compression. Specifically, during the process of forming the graphite film 220, the jig 300 is first provided, then a certain amount of graphite 400, for example, natural graphite or artificial graphite (also referred to as expanded graphite), is filled in the jig 300, and a compression force is applied to the jig 300, so as to form the graphite film 220 of high purity and density by compression. In this embodiment, the compression force for forming the graphite film 220 is at least 80 kgf/cm$^2$. If the compression force is smaller than 80 kgf/cm$^2$, the graphite cannot be formed into a smooth and flat film layer as required in this embodiment, and the density and corrosion-resistant effect of the graphite film are also deteriorated. A microstructure of the graphite film 220 of this embodiment is shown in a scanning electron microscopy (SEM) image in FIG. 7.

A thickness of the graphite film 220 in this embodiment is between 0.01 mm and 1 mm. Persons skilled in the art may change the thickness and density of the graphite film 220 correspondingly by adjusting the added amount of the graphite or the compression force, and the present invention is not limited to this embodiment. In addition, heat may be applied to the jig 300 in the process of forming the graphite film 220 by compression, so as to enhance the bonding strength and density of the graphite film 220.

Referring to FIG. 3D together with the process in FIG. 1, the method for fabricating the bi-polar plate of the fuel cell provided by the present invention further comprises forming a flow passage 221 on a side surface of the graphite film 220 (Step 111). It should be noted that, the flow passage 221 on the graphite film 220 may be formed on the side surface of the graphite film 220 during the process of forming the graphite film 220 by compression, or independently formed on the graphite film 220 in the subsequent process of the bi-polar plate. The step of forming the flow passage 221 is not limited to the embodiment of the present invention.

Figure 4A:
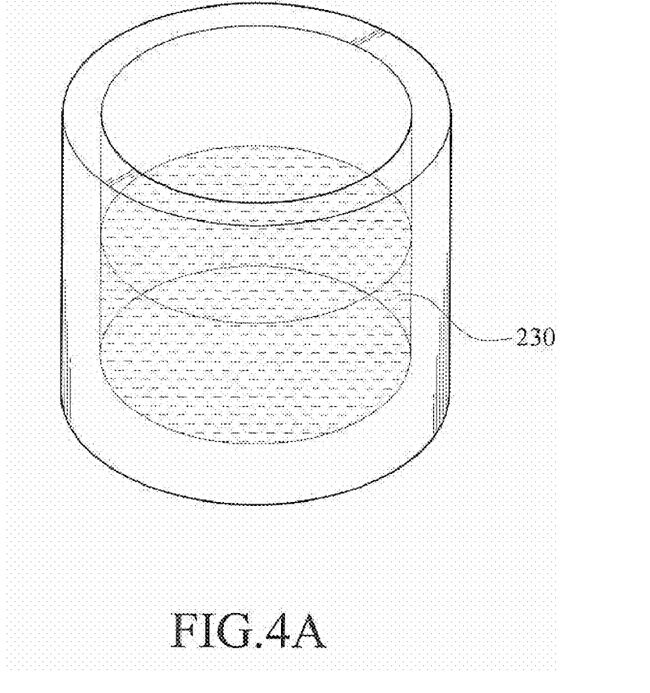
Figure 4B:
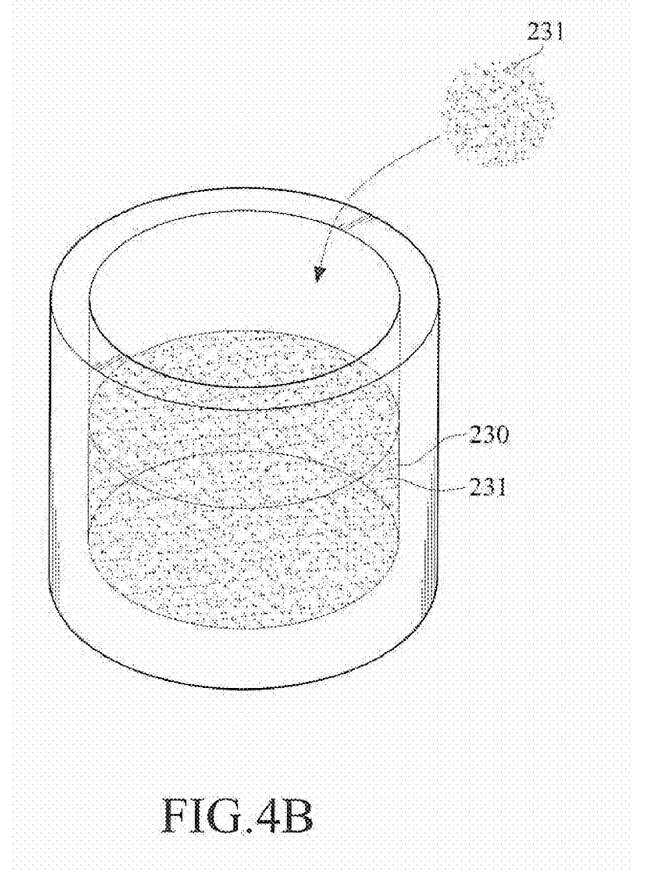
Figure 4C:
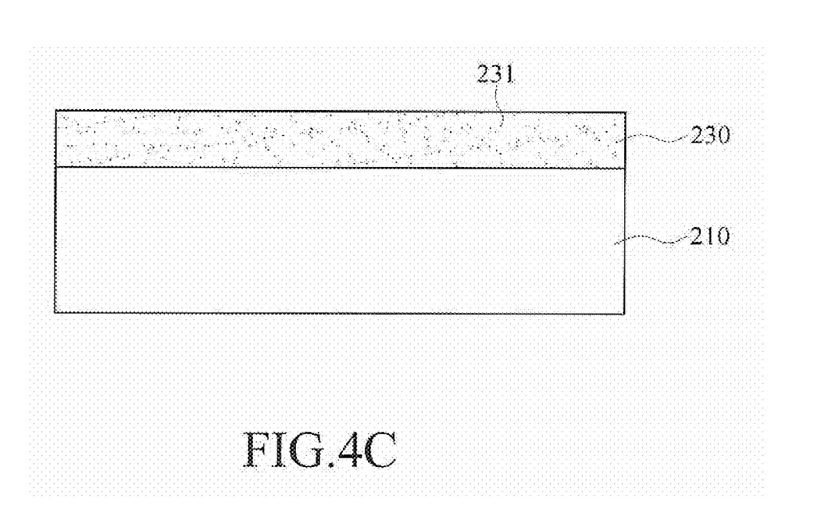

Further referring to FIGS. 4A to 4C together with the process in FIG. 1, a polymeric material 230, for example, thermal hardening (thermal curing) resin, light hardening (photo curing) resin, or chemical hardening resin, is provided. Electrically conductive powder 231 is added in the polymeric material 230. The electrically conductive powder 231 is between 1 wt. % and 20 wt. % of total weight of the electrically conductive powder 231 and the polymeric material 230. The electrically conductive powder 231 may be metal powder such as Au, Pt, Pd, Ti, Ni, Cr, or any alloy thereof, graphite powder, carbon powder, carbon nanotube, carbon fiber, or any mixed powder thereof. A particle size of the electrically conductive powder 231 is controlled between 1 nm and 200 nm. However, persons skilled in the art may use powder having good electrically conductive characteristics and suitable particle sizes according to actual requirements, instead of being limited to the embodiment of the present invention.

The polymeric material 230 added with the electrically conductive powder 231 is stirred with mechanical equipment or manually, so as to make the electrically conductive powder 231 uniformly distributed in the polymeric material 230. Next, the polymeric material 230 containing the electrically conductive powder 231 is coated on a surface of the metal substrate 210 (Step 120). The polymeric material 230 in this embodiment may be uniformly coated on the metal substrate 210 in various manners such as blade-coating, spin-coating, spray-coating, slot-coating, or roll-coating.

Figure 5:
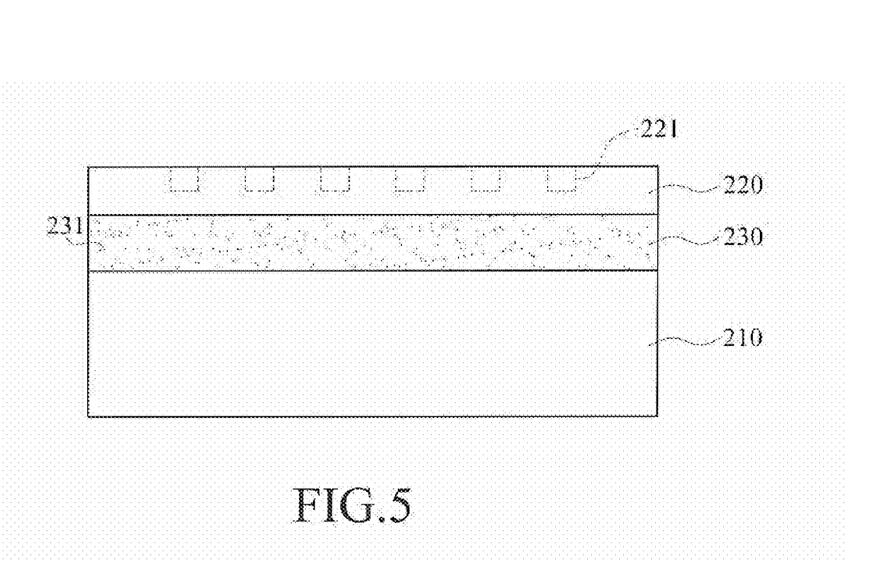
Figure 6:
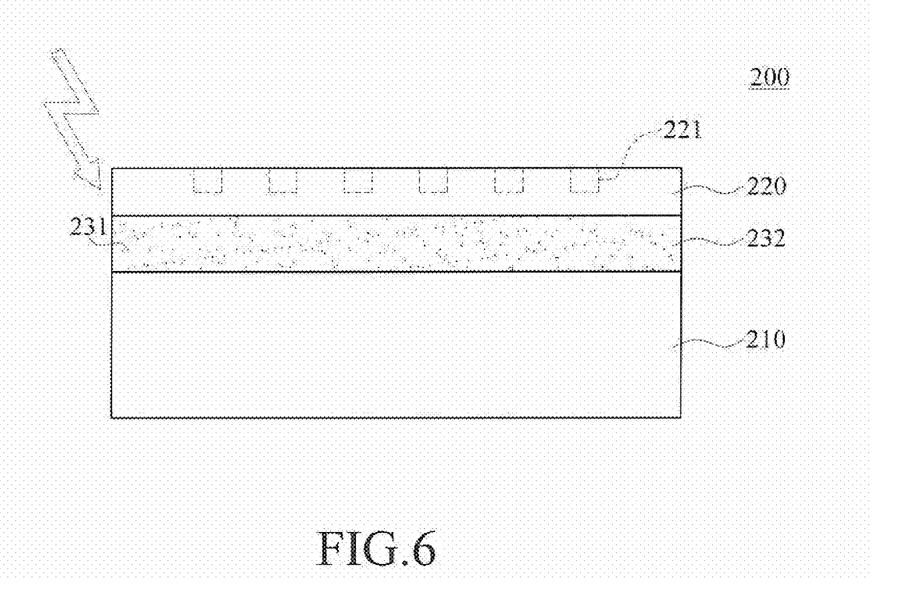

Referring to FIGS. 1, 5, and 6, the fabricated graphite film 220 is disposed on the polymeric material 230 (Step 130), and the graphite film 220 is attached to the polymeric material 230 on a side surface without the flow passage 221. Next, the polymeric material 230 is hardened to form an adhesive layer 232 (Step 140), such that the graphite film 220 is fixedly bonded on the metal substrate 210, thereby completing the structure of the bi-polar plate of the fuel cell 200. In this embodiment, a thickness of the adhesive layer 232 is controlled between 10 μm and 600 μm, but the present invention is not limited thereto.

Figure 8A:
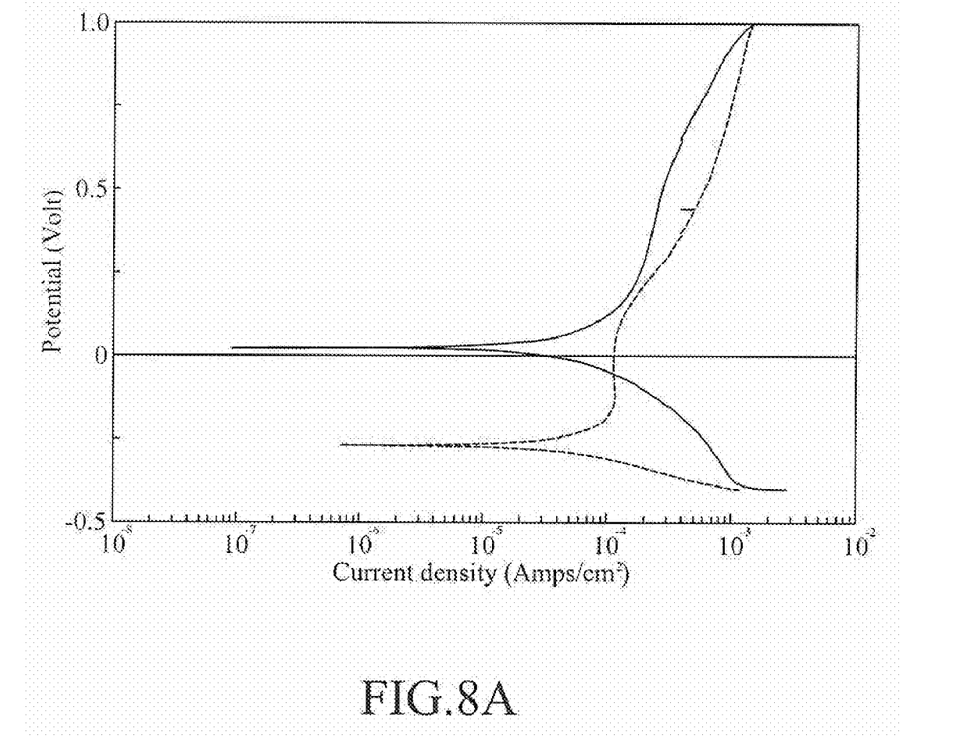
FIG. 8A is a polarization curve analysis diagram of a stainless steel substrate.
Figure 8B:
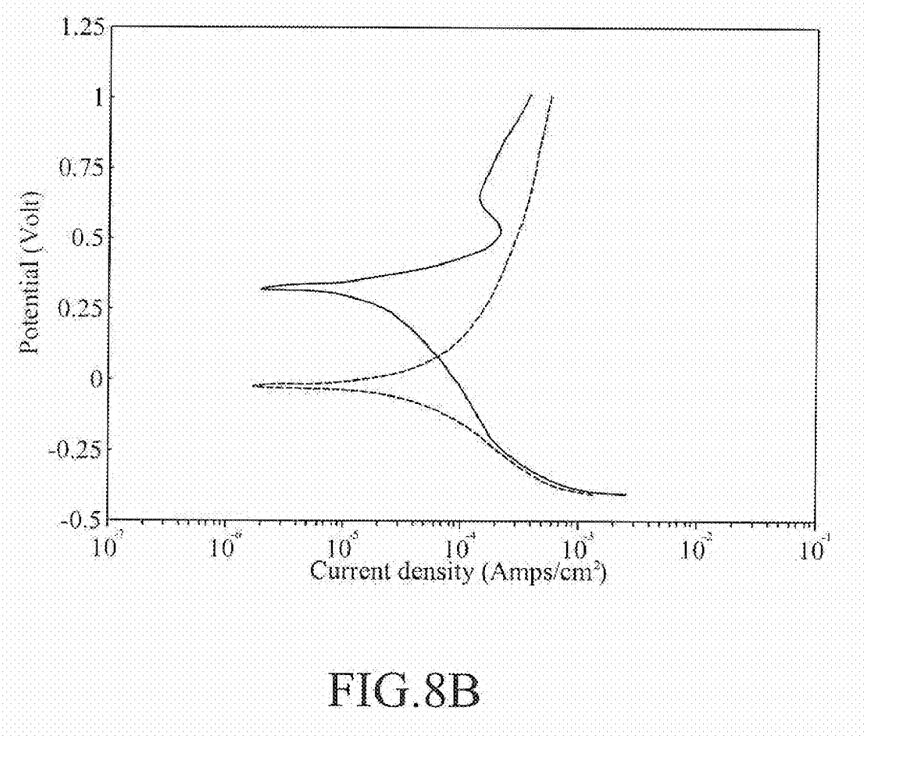
FIG. 8B is a polarization curve analysis diagram of the stainless steel substrate bonded with the graphite film according to the present invention.

Referring to polarization curve analysis diagrams in FIGS. 8A and 8B, a corrosion-resistant test is performed with a sulfuric acid solution of 0.5 M and lasts for 1000 hours.

FIG. 8A shows a dynamic polarization curve of a corrosion-resistant test on a 316L stainless steel substrate not coated with the graphite film according to the present invention. The real line segment is a polarization curve before the 316L stainless steel substrate is immersed in the sulfuric acid solution, and the dotted line segment is a polarization curve after the 316L stainless steel substrate is immersed in the sulfuric acid solution for 1000 hours. Seen from FIG. 8A, before the blank 316L stainless steel substrate (not coated with the graphite film) is immersed in 0.5 M sulfuric acid solution, the obtained corrosion current density is about $10^{-6}$ Amps/cm$^2$. After immersing in 0.5 M sulfuric acid solution for 1000 hours, the obtained corrosion current density increases to about $10^{-7}$ Amps/cm$^2$. It is apparent that, the corrosion-resistant characteristic of the blank 316L stainless steel substrate not coated with the graphite film is severely deteriorated after being placed in a corrosive environment for a long time, thus affecting the reliability of the bi-polar plate of the fuel cell.

FIG. 8B shows a dynamic polarization curve of a corrosion-resistant test of a 316L stainless steel substrate coated with the graphite film according to the present invention. The real line segment is a polarization curve before the 316L stainless steel substrate is immersed in 0.5 M sulfuric acid solution, and the dotted line segment is a polarization curve after the 316L stainless steel substrate is immersed in 0.5 M sulfuric acid solution for 1000 hours. Seen from FIG. 8B, after the 316L stainless steel substrate coated with the graphite film is immersed in the sulfuric acid solution for 1000 hours, the obtained corrosion current density shows no obvious increase than the value obtained from the same substrate but not immersed in 0.5 M sulfuric acid solution. It is apparent that, the 316L stainless steel substrate coated with the graphite film of the present invention still keeps good corrosion-resistant characteristic after being placed in a corrosive environment for a long time.

Figure 9A:
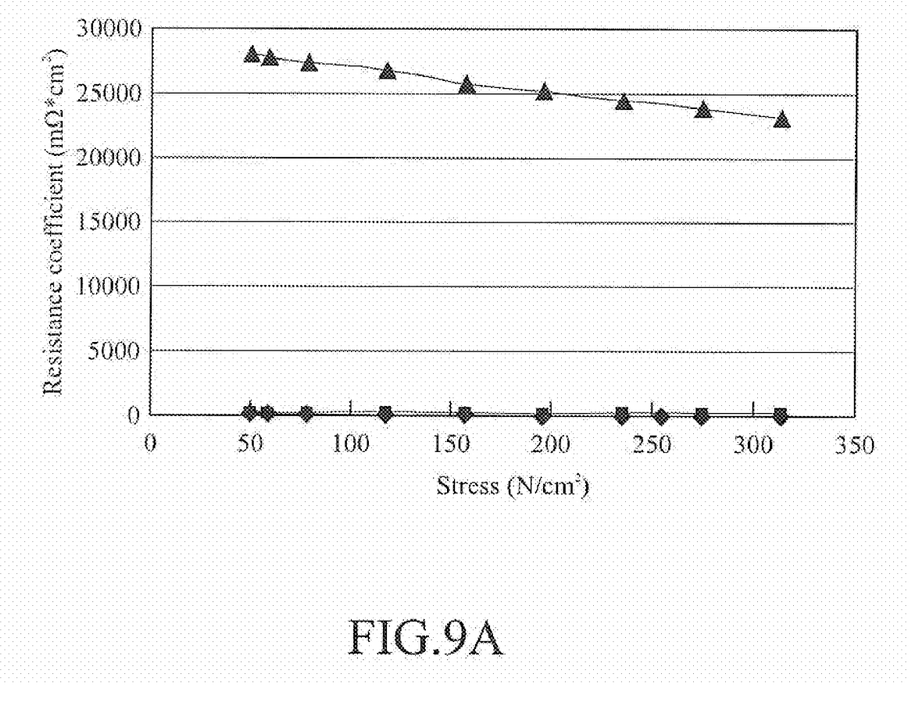
FIG. 9A is a curve analysis diagram of interfacial contact resistance according to the present invention.
Figure 9B:
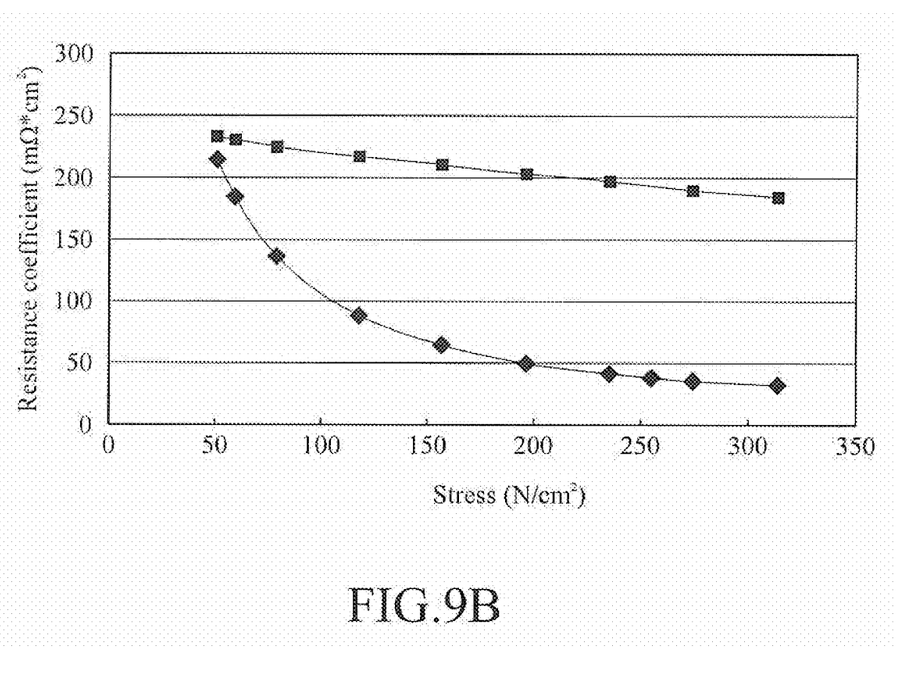
FIG. 9B is a curve analysis diagram of interfacial contact resistance according to the present invention.

FIGS. 9A and 9B are curve analysis diagrams of interfacial contact resistance, in which an X axis represents stress values at a unit of $N/cm^2$, and a Y axis represents interfacial contact resistance (I.C.R.) at a unit of $m\Omega*cm^2$. The curve line segments marked by a symbol ♦ are curves of interfacial contact resistance of the blank 316L stainless steel substrate not coated with the graphite film, the curve line segments marked by a symbol ■ are curves of interfacial contact resistance of the 316L stainless steel substrate coated with the graphite film and having the adhesive layer containing the electrically conductive powder, and the curve line segments marked by a symbol ▲ are curves of interfacial contact resistance of the 316L stainless steel substrate coated with the graphite film and having the adhesive layer containing no electrically conductive powder.

It can be seen from FIG. 9A that, an interfacial contact resistance value of the 316L stainless steel substrate coated with the graphite film but with the adhesive layer containing no electrically conductive powder is apparently higher than the values of the other two stainless steel samples. Thereby, the adhesive layer added with the electrically conductive powder of the present invention can effectively decrease interfacial contact resistance of the bi-polar plate. For the bi-polar plate of the present invention, the graphite film provides the horizontally electrical conductivity and the electrically conductive powder in the adhesive layer provides the vertically electrical conductivity, such that the bi-polar plate of the present invention achieves a good electrically conductive characteristic.

In addition, referring to FIG. 9B, comparing the curves of interfacial contact resistance of the 316L stainless steel substrate not coated with the graphite film and the 316L stainless steel substrate coated with the graphite film and having the adhesive layer containing the electrically conductive powder, a certain stress needs to be applied to the 316L stainless steel substrate not coated with the graphite film to reduce the interfacial contact resistance, while the interfacial contact resistance of the 316L stainless steel substrate coated with the graphite film and having the adhesive layer containing the electrically conductive powder does not change greatly under the great stress.

In the method for fabricating the bi-polar plate of the fuel cell according to the present invention, the graphite film is formed first, and then the graphite film is bonded to the metal substrate via the adhesive layer formed by hardening the polymeric material. Therefore, the method for fabricating the bi-polar plate of the present invention is different from that of the conventional bi-polar plate, such that the problem of a large number of defects generated during the dry-film forming process of the electrically conductive protection layer of the conventional bi-polar plate is effectively eliminated, and the fabrication method of the present invention can be widely applied for fabrication of a bi-polar plate of a high temperature or low temperature fuel cell.

In the present invention, through double protection of the graphite film and the adhesive layer, the metal substrate is effectively prevented from direct contact with the acidic solution of the fuel cell, thereby improving the electrically conductive performance, prolonging the service life, and enhancing the reliability of the bi-polar plate, and also achieving the effects of lowering the manufacturing cost, acquiring good corrosion-resistant performance, and enabling mass production.

What is claimed is:

1. A bi-polar plate of a fuel cell, comprising:
   a metal substrate;
   an adhesive layer, disposed on and contacted with a surface of the metal substrate, and comprising polymeric material and electrically conductive powder, wherein the electrically conductive powder is metal powder; and
   a graphite film, disposed on and contacted with the adhesive layer, wherein the adhesive layer and the graphite film are different layers, and the material of the adhesive layer is different from the material of the graphite film.

2. The bi-polar plate of the fuel cell according to claim 1, wherein the metal substrate is made of Al, Ti, Ni, Cu, Cr, Sn, or any alloy thereof, or stainless steel.

3. The bi-polar plate of the fuel cell according to claim 1, wherein the graphite film is formed with a jig by compression.

4. The bi-polar plate of the fuel cell according to claim 3, wherein a compression force of the jig is at least 80 $kgf/cm^2$.

5. The bi-polar plate of the fuel cell according to claim 1, wherein a thickness of the graphite film is in a range of 0.01 mm to 1 mm.

6. The bi-polar plate of the fuel cell according to claim 1, wherein the metal powder is Au, Pt, Pd, Ti, Ni, Cr, or any alloy thereof.

7. The bi-polar plate of the fuel cell according to claim 1, wherein a size of the electrically conductive powder is in a range of 1 nm to 200 nm.

8. The bi-polar plate of the fuel cell according to claim 1, wherein the electrically conductive powder is in a range of 1 wt. % to 20 wt. % of the total weight of the conductive powder and the polymeric material.

9. The bi-polar plate of the fuel cell according to claim 1, wherein the polymeric material is one selected from the group consisting of thermal hardening resin, light hardening resin, or chemical hardening resin.

10. The bi-polar plate of the fuel cell according to claim 1, wherein a thickness of the adhesive layer is in a range of 10 µm to 600 µm.

11. The bi-polar plate of the fuel cell according to claim 1, wherein the interface between the metal substrate and the adhesive layer is a flat surface.

12. The bi-polar plate of the fuel cell according to claim 11, wherein the graphite film further has a flow passage on a side surface away from the metal substrate.

* * * * *